United States Patent
Tashiro et al.

(10) Patent No.: US 9,211,654 B2
(45) Date of Patent: Dec. 15, 2015

(54) CONTINUOUS FIBER-REINFORCED THERMOPLASTIC RESIN PELLETS AND MANUFACTURING METHOD OF THE SAME

(75) Inventors: Naoyuki Tashiro, Takasago (JP); Atsushi Yamamoto, Takasago (JP); Takayasu Fujiura, Kobe (JP); Naoki Kikuchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1270 days.

(21) Appl. No.: 12/523,324

(22) PCT Filed: Mar. 7, 2008

(86) PCT No.: PCT/JP2008/054120
§ 371 (c)(1),
(2), (4) Date: Jul. 16, 2009

(87) PCT Pub. No.: WO2008/111498
PCT Pub. Date: Sep. 18, 2008

(65) Prior Publication Data
US 2010/0098946 A1    Apr. 22, 2010

(30) Foreign Application Priority Data
Mar. 12, 2007 (JP) .................................. 2007-062125

(51) Int. Cl.
| | | |
|---|---|---|
| B65H 51/08 | (2006.01) | |
| D07B 3/00 | (2006.01) | |
| D02G 1/08 | (2006.01) | |
| B29B 9/14 | (2006.01) | |
| B29B 15/12 | (2006.01) | |
| B29C 47/00 | (2006.01) | |
| B29C 47/02 | (2006.01) | |
| B29C 53/14 | (2006.01) | |

(52) U.S. Cl.
CPC ................. *B29B 9/14* (2013.01); *B29B 15/122* (2013.01); *B29C 47/003* (2013.01); *B29C 47/0016* (2013.01); *B29C 47/025* (2013.01); *B29C 53/14* (2013.01); *B29C 47/0033* (2013.01); *B29C 2793/009* (2013.01); *Y10T 428/2925* (2015.01)

(58) Field of Classification Search
CPC ............ C08J 3/12; C08K 7/02; C08L 101/00; C09C 1/30; C09C 1/28; C01B 33/12; C01B 33/04; C01B 31/06; B29K 101/12; B29K 105/14; B29K 309/08; B29K 2105/101; B29K 2101/12; B29B 9/14; B29B 15/12; B29B 11/16; B29B 9/02; B29B 9/06; B29B 15/122; B29C 70/20; B29C 45/00; B29C70/52; B29C 65/00; B29C 70/525; B29C 70/521; B29C 70/504; B29C 70/523; B29C 2037/90; B29C 45/0005; B29C 2045/0091; B65H 57/14; B65H 57/24; B65H 21/00; B32B 37/00; E04C 5/01; E04C 5/07; D01H 5/78; D01H 1/00; D01H 5/74; D01H 5/22; D01D 5/253; Y10T 156/12; Y10T 156/1064; Y10T 156/1085; Y10T 156/1059; Y10T 156/1317; Y10T 156/1082; Y10T 428/2925; Y10T 428/2964; Y10T 428/2982; Y10T 428/2998; Y10T 428/2922; Y10T 428/2978; Y10T 428/2973; Y10T 428/2909; Y10T 428/2913; Y10T 428/29; Y10T 428/298; Y10T 428/26; Y10T 428/2938; Y10T 428/2931; Y10T 428/2907; Y10S 428/922; Y10S 264/53
USPC ......... 428/332–335, 221, 364, 401, 292, 359, 428/400, 294, 295, 375, 378, 397, 357, 362, 428/369, 298.7, 298.1, 361, 399; 156/181, 156/441, 166, 168, 173, 175, 180, 254, 148, 156/270, 327, 304.5, 304.1, 257, 556, 553, 156/268, 502; 264/495, 371, 136, 140, 264/171.13, 211, 103, 148; 425/321, 322, 425/366, 367, 391, 182; 57/293, 102, 331, 57/334, 348, 401, 1 R, 285, 311, 314, 332
See application file for complete search history.

(56) References Cited

U.S. PATENT DOCUMENTS

| | | | |
|---|---|---|---|
| 3,403,069 A | | 9/1968 | Benson |
| 4,522,022 A | * | 6/1985 | Parker et al. .............. 57/401 |
| 4,549,920 A | * | 10/1985 | Cogswell et al. .......... 156/181 |
| 4,559,262 A | * | 12/1985 | Cogswell et al. .......... 428/298.7 |
| 4,607,483 A | * | 8/1986 | Siecke et al. .............. 57/334 |
| 5,639,410 A | * | 6/1997 | Amaike et al. ............ 264/136 |
| 5,725,954 A | * | 3/1998 | Montsinger ............... 428/397 |
| 6,291,064 B1 | * | 9/2001 | Kadowaki et al. ........ 428/332 |
| 2001/0033928 A1 | | 10/2001 | Kadowaki et al. |
| 2007/0175570 A1 | * | 8/2007 | Jentgens et al. ........... 156/181 |

FOREIGN PATENT DOCUMENTS

| | | | |
|---|---|---|---|
| EP | 0 393 536 A2 | | 10/1990 |
| EP | 0 393 536 A3 | | 10/1990 |
| EP | 1 136 216 A1 | | 9/2001 |
| JP | 5 169445 | | 7/1993 |
| JP | 5-169445 | | 7/1993 |
| JP | 05169445 A | * | 7/1993 |
| JP | 05331720 A | * | 12/1993 |
| JP | 6-182761 | | 7/1994 |
| JP | 2000 37723 | | 2/2000 |
| JP | 3114311 | | 12/2000 |
| JP | 2001-300935 | | 10/2001 |
| JP | 2001 300935 | | 10/2001 |
| JP | 2003 175512 | | 6/2003 |
| JP | 2003-175512 | | 6/2003 |
| JP | 2003175512 A | * | 6/2003 |
| JP | 2006-231922 | | 9/2006 |
| JP | 2006-307001 A | | 11/2006 |
| JP | 2007301759 A | * | 11/2007 |
| JP | 2008155589 A | * | 7/2008 |
| KR | 2003 97675 | | 12/2003 |
| WO | WO 2004103664 A1 | * | 12/2004 |

OTHER PUBLICATIONS

Extended European Search Report issued Nov. 7, 2011, in European Patent Application No. 08721538.0
Japanese Office Action issued Aug. 23, 2011, in Patent Application No. 2007-062125 (with English-language translation).
Office Action issued Aug. 24, 2011, in Chinese Patent Application No. 200880007823.X with English translation.
Chinese Office Action issued Feb. 13, 2012 in patent application No. 200880007823.X with English translation.

* cited by examiner

*Primary Examiner* — Jennifer Chriss
*Assistant Examiner* — Altrev Sykes
(74) *Attorney, Agent, or Firm* — Oblon, McClelland, Maier & Neustadt, L.L.P.

(57) ABSTRACT

To provide continuous fiber-reinforced thermoplastic pellets having a good dispersion property of a reinforcing fiber bundle in injection molded articles and capable of achieving a satisfactory outward appearance of the injection molded articles and satisfying a mechanical strength of the injection molded articles by fully exerting the reinforcing effect, and a manufacturing method of the same.

In continuous fiber-reinforced thermoplastic resin pellets manufactured by letting a long reinforcing fiber bundle be impregnated with molten thermoplastic resin and pultruding the resin-impregnated reinforcing fiber bundle with twisting, followed by the cutting of a rod-shaped composition formed of the twisted resin-impregnated reinforcing fiber bundle into pellets, a volume filling ratio $V_f$, which is a proportion of a cross section area of the reinforcing fiber bundle in a cross section area of a pellet cross section in a direction perpendicular to a pellet longitudinal direction, is in a range of 70% to 20%, and a twisting pitch P given by $P=L/d$ (where L is a traveling length of a twist in a rod-shaped composition longitudinal direction per rotation of the rod-shaped composition, and d is a diameter of a circle comparable to an area of a rod-shaped composition cross section) is in a range of 2.5 to 36 (m/rev·m).

11 Claims, 6 Drawing Sheets

CONTINUOUS FIBER-REINFORCED THERMOPLASTIC RESIN PELLETS AND MANUFACTURING METHOD OF THE SAME

TECHNICAL FIELD

The present invention relates to continuous fiber-reinforced thermoplastic resin pellets and a manufacturing method of the same. More particularly, the invention relates to continuous fiber-reinforced thermoplastic resin pellets manufacturing by letting a long reinforcing fiber bundle be impregnated with molten thermoplastic resin and pultruding the resulting resin-impregnated reinforcing fiber bundle with twisting, followed by the cutting of a rod-shaped composition formed of the twisted resin-impregnated reinforcing fiber bundle into pellets, and a manufacturing method of the same.

BACKGROUND ART

A prior art, U.S. Pat. No. 3,114,311 (Patent Document 1), discloses a technique to obtain a continuous fiber-reinforced resin strand (rod-shaped composition) formed of a twisted resin-impregnated reinforcing fiber bundle by letting a long reinforcing fiber bundle be impregnated with molten thermoplastic resin and pultruding the resulting resin-impregnated reinforcing fiber bundle with the use of twisting rollers while being twisted by the twisting rollers, and to obtain continuous fiber-reinforced thermoplastic resin pellets by cutting the continuous fiber-reinforced resin strand into pellets of a specific length.

More specifically, a long reinforcing fiber bundle is soaked in a molten resin bath filled with thermoplastic resin for letting the fiber bundle be impregnated with molten resin. After the resulting resin-impregnated reinforcing fiber bundle is pulled out from the molten resin bath by way of a forming die, it is rotated in a twisting direction by the twisting rollers rotating in directions inclined with respect to the pulling-out direction, so that the resin-impregnated reinforcing fiber bundle is pultruded with twisting. A continuous fiber-reinforced resin strand (rod-shaped composition (rod)) formed of the twisted resin-impregnated reinforcing fiber bundle is cut into pellets of a specific length (for example, about 3 to 10 mm). Injection molded articles using the continuous fiber-reinforced thermoplastic resin pellets obtained as described above are used, for example, for vehicle interior members (the console box, the instrument panel, etc.), vehicle exterior members (the bumper, the fender, etc.), the housing for electronic device members (a notebook personal computer, a mobile phone, etc.), and so forth.

Because the prior art described above is configured to twist the continuous fiber-reinforced resin strand (rod-shaped composition) by imparting a torque to the strand while the strand is being pultruded, a resin layer is formed on the surface of the continuous fiber-reinforced resin strand. Consequently, it is thought that breaking and fluffing of the reinforced fibers forming the reinforcing fiber bundle occur less and the resin layer exerts a lubrication function between the self and the die, which enables a stable operation at a low pulling-out force (pultruding force).

In the prior art described above, however, depending on the value of a volume filling ratio $V_f$, which is a proportion of the cross section area of the reinforcing fiber bundle in the cross section area of the pellet cross section in a direction perpendicular to the pellet longitudinal direction, the reinforcing fiber bundle is concentrated in the center portion of the pellet cross section as the result of twisting, which makes the peripheral surface resin layer on the pellet thicker. Hence, when injection molding is performed using such continuous fiber-reinforced thermoplastic resin pellets, the peripheral surface resin layer is so thick that heat transfer to the reinforcing fiber bundle present in the center portion of the pellet is deteriorated when the pellets are heat-melted inside an injection molding machine. This consequently raises a problem that dispersion of the reinforcing fiber bundle in the injection molded articles is poor and the outward appearance and mechanical properties, such as strength, of the injection molded articles are deteriorated.

[Patent Document 1] U.S. Pat. No. 3,114,311 (page 1 and FIG. 1)

DISCLOSURE OF THE INVENTION

An object of the invention is to provide continuous fiber-reinforced thermoplastic resin pellets manufactured by cutting a rod-shaped composition formed of a twisted resin-impregnated reinforcing fiber bundle into pellets of a specific length, which are continuous fiber-reinforced thermoplastic resin pellets having a good dispersion property of the reinforcing fiber bundle in injection molded articles owing to the peripheral surface resin layer formed to have an adequate thickness and capable of achieving a satisfactory outward appearance of the injection molded articles and satisfying the mechanical strength of injection molded articles by fully exerting the reinforcing effect, and a manufacturing method of the same.

In to order solve the foregoing problems, the inventions of the present application have technical means configured as described below.

An invention set forth in claim 1 provides continuous fiber-reinforced thermoplastic resin pellets cut from a rod-shaped composition, characterized in that: the rod-shaped composition is formed by twisting a resin-impregnated reinforcing fiber bundle having a long reinforcing fiber bundle and molten thermoplastic resin impregnated into the reinforcing fiber bundle; the reinforcing fiber bundle is a bundle of monofilament fibers having a diameter of 4 to 30 μm; a volume filling ratio $V_f$, which is a proportion of a cross section area of the reinforcing fiber bundle in a cross section area of a pellet cross section in a direction perpendicular to a pellet longitudinal direction, is in a range of 70% to 20%; and a twisting pitch P given by P=L/d (where L is a traveling length of a twist in a rod-shaped composition longitudinal direction per rotation of the rod-shaped composition, and d is a diameter of a circle comparable to an area of a rod-shaped composition cross section) is in a range of 2.5 to 36 (m/rev·m).

The phrase, "a diameter of a circle comparable to an area", is used to specify the dimension of the diameter of the cross section in a case where the cross section area of the rod-shaped composition is of a circular shape, and in a case where the shape of the cross section of the rod-shaped composition is not a circle, the dimension of the diameter of a circle assumed to have the equal cross section area.

An invention set forth in claim 2 relates to the continuous fiber-reinforced thermoplastic resin pellets according to claim 1, characterized in that when the volume filling ratio $V_f$ satisfies 70%≥$V_f$>50%, a range of the twisting pitch P is given as 2.5 (m/rev·m)≤P<6.0 (m/rev·m), and when the volume filling ratio $V_f$ satisfies 50%≥$V_f$≥20%, a range of the twisting pitch P is given as 6.0 (m/rev·m)≤P≤36 (m/rev·m).

An invention set forth in claim 3 relates to the continuous fiber-reinforced thermoplastic resin pellets according to claim 1 or 2, characterized in that when the volume filling ratio $V_f$ satisfies 70%≥$V_f$>50%, a ratio $A_f$ in the pellet cross section, which is a proportion of an area inside a virtual line enclosing an outermost peripheral portion of the reinforcing fiber bundle within the pellet cross section in an area of the pellet cross section, is in a range given as $(1.8V_f-0.01V_f^2)\% \leq A_f \leq 95\%$, and when the volume filling ratio $V_f$ satisfies $50\% \geq V_f \geq 20\%$, the ratio $A_f$ is in a range given as $(2.3V_f-0.02V_f^2)\% \leq A_f \leq 95\%$.

An invention set forth in claim 4 provides continuous fiber-reinforced thermoplastic resin pellets cut from a rod-shaped composition, characterized in that: the rod-shaped composition is formed by twisting a resin-impregnated reinforcing fiber bundle having a long reinforcing fiber bundle and molten thermoplastic resin impregnated into the reinforcing fiber bundle; the reinforcing fiber bundle is a bundle of mono-filament fibers having a diameter of 4 to 30 µm; a volume filling ratio $V_f$, which is a proportion of a cross section area of the reinforcing fiber bundle in a cross section area of a pellet cross section in a direction perpendicular to a pellet longitudinal direction, is in a range of 70% to 20%; and when the volume filling ratio $V_f$ satisfies $70\% \geq V_f > 50\%$, a ratio $A_f$ in the pellet cross section, which is a proportion of an area inside a virtual line enclosing an outermost peripheral portion of the reinforcing fiber bundle within the pellet cross section in an area of the pellet cross section, is in a range given as $(1.8V_f-0.01V_f^2)\% \leq A_f \leq 95\%$, and when the volume filling ratio $V_f$ satisfies $50\% \geq V_f \geq 20\%$, the ratio $A_f$ is in a range given as $(2.3V_f-0.02V_f^2)\% \leq A_f \leq 95\%$.

An invention set forth in claim 5 is a manufacturing method of continuous fiber-reinforced thermoplastic resin pellets manufactured by letting a long reinforcing fiber bundle be impregnated with molten thermoplastic resin and pultruding the resin-impregnated reinforcing fiber bundle with twisting, followed by cutting of a rod-shaped composition formed of the twisted resin-impregnated reinforcing fiber bundle by a specific length, characterized in that: a bundle of mono-filament fibers having a diameter of 4 to 30 µm is used as the reinforcing fiber bundle; the number of the mono-filament fibers is set so that the reinforcing fiber bundle is impregnated with the molten thermoplastic resin for a volume filling ratio $V_f$, which is a proportion of a cross section area of the reinforcing fiber bundle in a cross section area of a rod-shaped composition cross section in a direction perpendicular to a rod-shaped composition longitudinal direction, to fall within a range of 70% to 20%; and the resin-impregnated reinforcing fiber bundle is pultruded with twisting by setting a twisting angle so that a twisting pitch P given by P=L/d (where L is a traveling length of a twist in the rod-shaped composition longitudinal direction per rotation of the rod-shaped composition, and d is a diameter of a circle comparable to an area of the rod-shaped composition cross section) falls within a range of 2.5 to 36 (m/rev·m).

An invention set forth in claim 6 relates to the manufacturing method of continuous fiber-reinforced thermoplastic resin pellets according to claim 5, characterized in that the twisting angle is set so that when the volume filling ratio $V_f$ satisfies $70\% \geq V_f > 50\%$, the twisting pitch P is in a range given as 2.5 (m/rev·m)≤P<6.0 (m/rev·m), and when the volume filling ratio $V_f$ satisfies $50\% \geq V_f \geq 20\%$, the twisting pitch P is in a range given as 6.0 (m/rev·m)≤P≤36 (m/rev·m).

An invention set forth in claim 7 relates to the manufacturing method of continuous fiber-reinforced thermoplastic resin pellets according to claim 5 or 6, characterized in that the twisting angle is set so that when the volume filling ratio $V_f$ satisfies $70\% \geq V_f > 50\%$, a ratio $A_f$ in the rod-shaped composition cross section, which is a proportion of an area inside a virtual line enclosing an outermost peripheral portion of the reinforcing fiber bundle within the rod-shaped composition cross section in an area of the rod-shaped composition cross section, is in a range given as $(1.8V_f-0.01V_f^2)\% \leq A_f \leq 95\%$, and when the volume filling ratio $V_f$ satisfies $50\% \geq V_f \geq 20\%$, the ratio $A_f$ is in a range given as $(2.3V_f-0.02V_f^2)\% \leq A_f \leq 95\%$.

An invention set forth in claim 8 is a manufacturing method of continuous fiber-reinforced thermoplastic resin pellets manufactured by letting a long reinforcing fiber bundle be impregnated with molten thermoplastic resin and pultruding the resin-impregnated reinforcing fiber bundle with twisting, followed by cutting of a rod-shaped composition formed of the twisted resin-impregnated reinforcing fiber bundle by a specific length, characterized in that: a bundle of mono-filament fibers having a diameter of 4 to 30 µm is used as the reinforcing fiber bundle; the number of the mono-filament fibers is set so that the reinforcing fiber bundle is impregnated with the molten thermoplastic resin for a volume filling ratio $V_f$, which is a proportion of a cross section area of the reinforcing fiber bundle in a cross section area of a rod-shaped composition cross section in a direction perpendicular to a rod-shaped composition longitudinal direction, to fall within a range of 70% to 20%; and the resin-impregnated reinforcing fiber bundle is pultruded with twisting by setting a twisting angle so that when the volume filling ratio $V_f$ satisfies $70\% \geq V_f > 50\%$, a ratio $A_f$ in the rod-shaped composition cross section, which is a proportion of an area inside a virtual line enclosing an outermost peripheral portion of the reinforcing fiber bundle within the rod-shaped composition cross section in an area of the rod-shaped composition cross section, is in a range given as $(1.8V_f-0.01V_f^2)\% \leq A_f \leq 95\%$, and when the volume filling ratio $V_f$ satisfies $50\% \geq V_f \geq 20\%$, the ratio $A_f$ is in a range given as $(2.3V_f-0.02V_f^2)\% \leq A_f \leq 95\%$.

BEST MODE FOR CARRYING OUT THE INVENTION

Hereinafter, the invention will be described.

Figure 1:
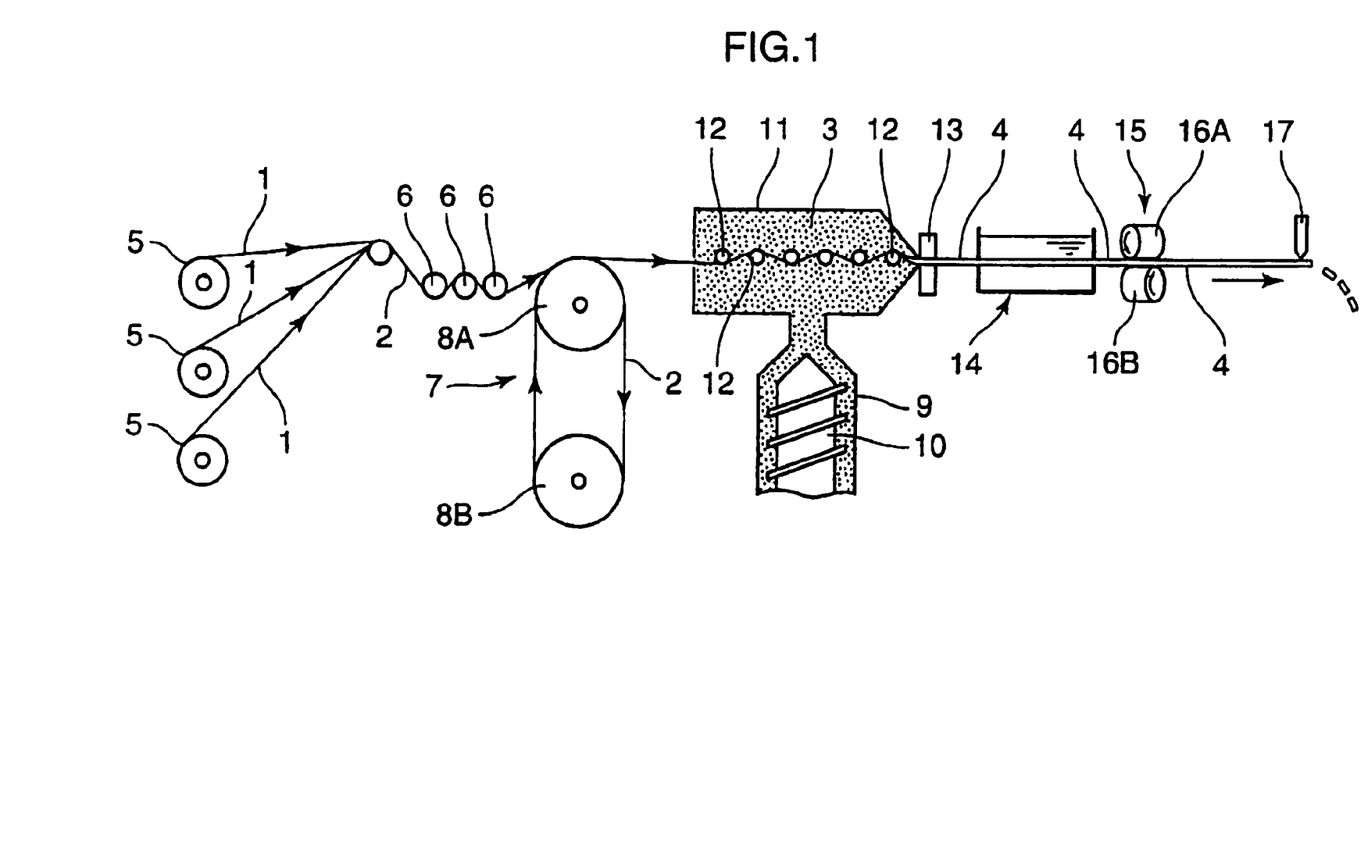
FIG. 1 is a configuration explanatory view showing an example of a manufacturing apparatus for manufacturing continuous fiber-reinforced thermoplastic resin pellets of the invention.

FIG. 1 is a configuration explanatory view showing an example of a manufacturing apparatus for manufacturing continuous fiber-reinforced thermoplastic resin pellets of the invention.

As is shown in FIG. 1, a reinforcing fiber bundle 2 (roving bundle) formed of mono-filament fibers (rovings) 1 fed from respective bobbins 5 is introduced into a pre-heating heating device 7 provided with a pair of heating rollers 8A and 8B disposed at top and bottom to undergo pre-heating. By being wound around a pair of the heating rollers 8A and 8B alternately in several turns while back tension is applied thereto from plural guide gars 6, the reinforcing fiber bundle 2 is heated through contact heating as it comes into close contact with the heated heating rollers 8A and 8B.

An extruding machine 9 having a built-in screw 10 and a soaking head (molten resin bath container) 11 into which molten resin (molten thermoplastic resin) 3 is continuously supplied from the extruding device 9 and the heated reinforcing fiber bundle 2 is introduced from the pre-heating heating device 7 are provided directly downstream from the pre-heating heating device 7. Plural soaking rollers 12 to let the continuously introduced reinforcing fiber bundle 2 be impregnated with the molten resin 3 are provided inside the soaking head 11. The reinforcing fiber bundle 2 impregnated with the molten resin 3 is twisted while it travels from the soaking rollers 12 to a twisting device 15 described below, and a continuous fiber-reinforced resin strand (rod-shaped composition) 4 formed of the resin-impregnated reinforcing fiber bundle is formed. A die 13 that performs forming (molding) of the hot continuous fiber-reinforced resin strand (rod-shaped composition) 4 pultruded from the soaking head 11 is attached at the outlet of the soaking head 11.

A cooling device 14 that cools the hot continuous fiber-reinforced resin strand 4 from the soaking head 11 in cooling water is provided downstream from the soaking head 11 to which the die 13 is attached. Also, the twisting device 15 having the capability of imparting twists to the resin-impregnated reinforcing fiber bundle and the capability of pultruding the continuous fiber-reinforced resin strand 4 coming from upstream is provided directly downstream from the cooling device 14. Further, a pelletizer 17 that cuts the continuous fiber-reinforced resin strand 4 into pellets of a specific length is provided downstream from the twisting device 15.

Figure 2:
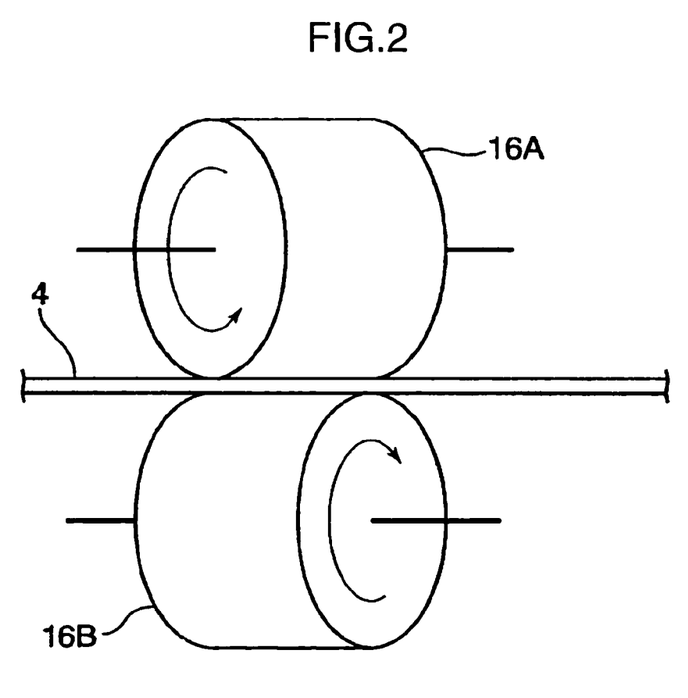
FIG. 2 is an explanatory view of a twisting device in FIG. 1.
Figure 3:
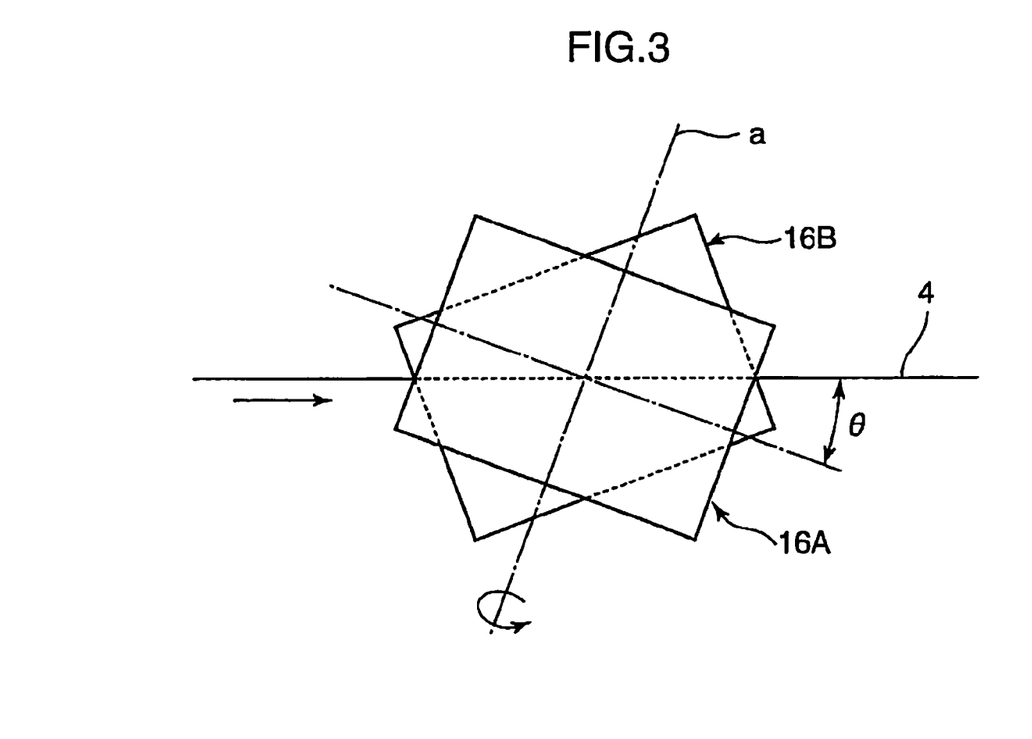
FIG. 3 is a view used to explain a twisting angle yielded by twisting rollers shown in FIG. 2.

FIG. 2 is an explanatory view of the twisting device of FIG. 1. FIG. 3 is a view used to describe the twisting angle yielded by the twisting rollers shown in FIG. 2.

The twisting device 15 is formed of a pair of twisting rollers 16A and 16B disposed oppositely with the continuous fiber-reinforced resin strand 4 coming from upstream in between while holding the respective rotating shaft lines on a parallel plane (horizontal plane) and the rotating shaft lines crossed each other. More specifically, the rotating shaft line of the upper twisting roller 16A and the rotating shaft line of the lower twisting roller 16B of FIG. 2 are set not in directions orthogonal to the pultruding direction (running direction) of the continuous fiber-reinforced resin strand 4 but in directions opposite to each other and in orientations shifted equally by a specific angle with respect to the pultruding direction when viewed in a plane.

As is shown in FIG. 3, when viewed in a plane, the angle yielded by the line orthogonal to the rotating shaft line a of the twisting roller 16A (16B) and the pultruding direction (running direction) of the continuous fiber-reinforced resin strand 4 is defined as the twisting angle θ. Fine asperities are formed on the entire roller surfaces (roller outer peripheral surfaces) of the twisting rollers 16A and 16B made of metal by knurl machining.

In the manufacturing apparatus configured in this manner, the reinforcing fiber bundle 2 is first introduced into a pair of the heating rollers 8A and 8B and is further introduced into the soaking head 11 while it is heated through contact heating as it is wound around the heating rollers 8A and 8B alternately in several turns. The reinforcing fiber bundle 2 is impregnated with resin while passing by the respective soaking rollers 12 inside the soaking head 11 filled with hot molten resin 3 supplied from the extruding machine 9 and is thereby made into a resin-impregnated reinforcing fiber bundle. With this resin-impregnated reinforcing fiber bundle, twists are developed and grown from the soaking roller 12 on the downstream side inside the soaking head 11 as the starting point owing to the twisting operations by the twisting rollers 16A and 16B. As has been described, the reinforcing fiber bundle 2 is impregnated with the molten resin 3 supplied from the extruding machine 9 and twists are imparted to the resin-impregnated reinforcing fiber bundle, and the continuous fiber-reinforced resin strand 4 formed of the resin-impregnated reinforcing fiber bundle to which are imparted the twists from the soaking head 11 is pultruded continuously.

Figure 4:
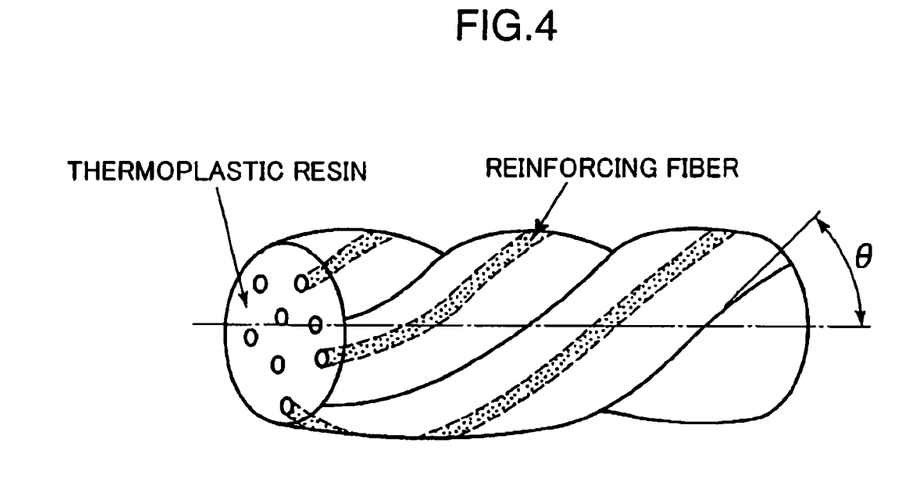
FIG. 4 is a schematic view of a continuous fiber-reinforced thermoplastic resin pellet.

The hot continuous fiber-reinforced resin strand 4 continuously pultruded from the soaking head 11 by way of the die 13 is cooled to harden in the cooling device 14 and introduced into the twisting rollers 16A and 16B. For the continuous fiber-reinforced resin strand 4 cooled by the cooling device 14, the twisting operation and the pultrusion are performed by the twisting rollers 16A and 16B set at the specific twisting angle θ. The continuous fiber-reinforced resin strand (rod-shaped composition) 4 having a circular cross section and introduced to the downstream side of the twisting device 15 is cut by a specific length by the pelletizer 17 and is thereby made into continuous fiber-reinforced thermoplastic resin pellets (hereinafter, occasionally referred to simply as the continuous fiber pellets) (see FIG. 4).

Hereinafter, the invention will be described more in detail. As has been described, the twisting rollers (16A and 16B) twist the resin-impregnated reinforcing fiber bundle and pultrude the continuous fiber-reinforced resin strand (hereinafter, occasionally referred to simply as the continuous fiber strand), which is the twisted resin-impregnated reinforcing fiber bundle. Let N (rmp) be the number of rotations of the twisting rollers and D (m) and θ (°) be the diameter and the twisting angle of the rollers, respectively, then, as can be understood from FIG. 2 and FIG. 3, the pultruding speed V (m/min) of the continuous fiber strand is expressed as Equation (1) below. Meanwhile, the rotational direction speed v (m/min) of the continuous fiber strand is expressed as Equation (2) below. In addition, let d (m) be the diameter of the continuous fiber strand defined as the diameter of a circle comparable to the cross section area of the continuous fiber strand, then the number of rotations n (rpm) of the continuous fiber strand is given by Equation (3) below.

$$V = \pi D N \cos\theta \quad (1)$$

$$v = \pi D N \sin\theta \quad (2)$$

$$n = \frac{v}{\pi d} = \frac{\pi D N \sin\theta}{\pi d} = \frac{D N \sin\theta}{d} \quad (3)$$

From the foregoing results, the twisting number X per 1 m of the continuous fiber strand is found by Equation (4) below, in accordance with which the number of rotations, n, of the continuous fiber strand is divided by the pultruding speed V of the continuous fiber strand. From Equation (4), it is understood that the twisting number X (rev/m) is determined by the diameter d of the continuous fiber strand and the twisting angle θ.

$$X = \frac{n}{V} = \frac{1}{\pi D N \cos\theta} \times \frac{D N \sin\theta}{d} = \frac{\tan\theta}{\pi d} \quad (4)$$

In addition, the twisting unit length (the length of the continuous fiber strand over which one turn of twist is imparted) L (m/rev) in this case is expressed as Equation (5)

below. The twisting pitch P (m/rev·m) independent of the diameter d of the continuous fiber strand is given by Equation (6) below. From Equations (4) and (6), the relation between the twisting number X and the twisting pitch P is expressed as Equation (7) below.

$$L = \frac{1}{X} = \frac{\pi d}{\tan \theta} \quad (5)$$

$$P = \frac{L}{d} = \frac{\pi}{\tan \theta} \quad (6)$$

$$X = \frac{1}{Pd} \quad (7)$$

Figure 5:
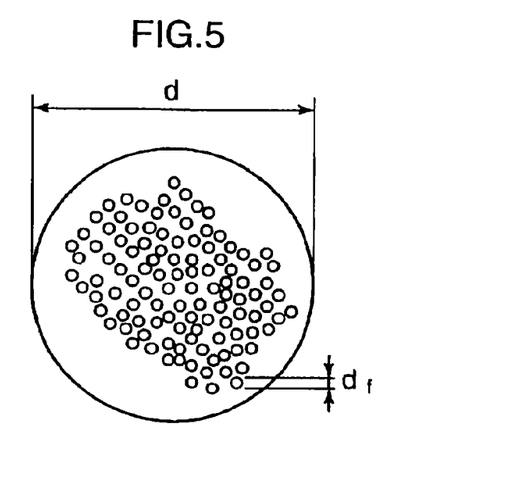
FIG. 5 is a view used to describe a volume filling ratio $V_f$ of a reinforcing fiber bundle.

Meanwhile, as is shown in FIG. 5, the volume filling ratio $V_f$ (%) of the reinforcing fiber bundle is determined by the diameter d of the continuous fiber strand (the diameter of a circle comparable to the area of the cross section of the continuous fiber strand) and the number of mono-filament fibers (rovings) to be introduced. More specifically, the volume filling ratio $V_f$ of the reinforcing fiber bundle is a proportion of the cross section area of the reinforcing fiber bundle in the cross section area of the strand cross section (pellet cross section) in a direction perpendicular to the continuous fiber strand longitudinal direction (pellet longitudinal direction). As is shown in FIG. 5, let $d_f$ be the diameter and m be the number of the mono-filament fibers (rovings), then the calculational cross section area $S_{fcalc}$ (m²) occupied by the reinforcing fiber bundle is found by Equation (8) below. Further, the cross section $S_s$ (m²) of the continuous fiber strand (continuous fiber pellet) is found by Equation (9) below. As is expressed by Equation (10) below, the volume filling ratio $V_f$ of the reinforcing fiber bundle is found by the ratio of the cross section area $S_{fcalc}$ to the cross section $S_s$.

$$S_{fcalc} = \frac{\pi}{4} d_f^2 \times m \quad (8)$$

$$S_s = \frac{\pi}{4} d^2 \quad (9)$$

$$V_f = \frac{S_{fcalc}}{S_s} \times 100 \quad (10)$$

A rate of content by weight, $W_f$(%), of the reinforcing fiber bundle can be found as a percent by weight of the reinforcing fiber bundle to the continuous fiber strand by finding percents by weight by multiplying specific gravities of the thermoplastic resin and the reinforcing fiber bundle together forming the continuous fiber strand (continuous fiber pellet) by the respective rates of content by volume. From such a relation, in a combination of specified thermoplastic resin and reinforcing fiber bundle, by determining the number of mono-filament fibers (rovings) and setting the volume filling ratio $V_f$ of the reinforcing fiber bundle, the diameter d of the continuous fiber strand (=diameter of the continuous fiber pellet) is automatically determined. By setting the twitting angle θ to correspond to the diameter d of the continuous fiber strand, the twisting number X is determined by Equation (4) above, according to which the twisting pitch P is determined.

Hence, continuous fiber pellets on which are formed the peripheral surface resin layers having an adequate thickness can be obtained by letting the reinforcing fiber bundle be impregnated with the molten thermoplastic resin by setting the number of fibers in the reinforcing fiber bundle for adjusting the volume filling ratio $V_f$ of the reinforcing fiber bundle to fall within a specific range, and pultruding the resin-impregnated reinforcing fiber bundle with twisting by setting (adjusting) the twisting angle θ for the twisting pitch P to fall within a specific range, followed by the cutting of the obtained continuous fiber strand by a specific length.

In this case, the volume filling ratio $V_f$ of the reinforcing fiber bundle is preferably in a range of 70% to 20%. When the volume filling ratio $V_f$ is smaller than 20%, the reinforcing effect is insufficient and the mechanical strength of injection molded articles is not satisfied. On the contrary, when the volume filling ratio $V_f$ exceeds 70% and the reinforcing fiber bundle accounts for too large a proportion, it becomes difficult to let the reinforcing fiber bundle be impregnated with molten thermoplastic resin, which makes it impossible to perform a pultruding operation of the continuous fiber strand. As the mono-filament fibers (rovings) used, mono-filament fibers having a diameter of 4 to 30 μm are preferable because of the strength and the ease of handling.

In a case where the volume filling ratio $V_f$ of the reinforcing fiber bundle is set in the specific range, in order to achieve an adequate thickness of the peripheral surface resin layer on the continuous fiber strand (continuous fiber pellet), the twisting number X is increased by making the twisting pitch P smaller as the volume filling ratio $V_f$ becomes higher so that the thickness of the peripheral surface resin layer will not become too thin, and conversely, the twisting number X is reduced by making the twisting pitch P larger as the volume filling ratio $V_f$ becomes lower so that the thickness of the peripheral surface resin layer will not become too thick. In this case, as is shown in Equation (6) above, it is possible to adjust the twisting pitch P by the twisting angle θ. As the twisting angle θ is made smaller, the twisting pitch P becomes larger, which causes the twisting number X to decrease. Conversely, as the twisting angle θ is made larger, the twisting pitch P becomes smaller, which causes the twisting number X to increase.

When the volume filling ratio $V_f$ is in the range of 70% to 20%, the twisting pitch P is preferably in a range of 2.5 to 36 (r/rev·m). More preferably, when the volume filling ratio $V_f$ satisfies 70%≥$V_f$>50%, a range given as 2.5 (m/rev·m) ≤P<6.0 (m/rev·m) is preferable, and when the volume filling ratio $V_f$ satisfies 50%≥$V_f$≥20%, a range given as 6.0 (m/rev·m)≤P≤36 (m/rev·m) is preferable.

When the twisting pitch P is smaller than 2.5 (m/rev·m) while the volume filling ratio $V_f$ satisfies 70%≥$V_f$>50% or when the twisting pitch P is smaller than 6.0 (m/rev·m) while the volume filling ratio $V_f$ satisfies 50%≥$V_f$≥20%, the continuous fiber pellet is in a state where too many twists are imparted (a state where the reinforcing fiber bundle exceedingly concentrates in the center portion of the pellet cross section). The thickness of the peripheral surface resin layer on the continuous fiber pellet thus becomes too thick, which deteriorates the dispersion property of the reinforcing fiber bundle in the injection molded articles. Hence, neither can a satisfactory outward appearance of injection molded be achieved, nor can the mechanical strength of the injection molded articles be satisfied by fully exerting the reinforcing effect.

Meanwhile, when the twisting pitch P is equal to or greater than 6.0 (m/rev·m) while the volume filling ratio $V_f$ satisfies 70%≥$V_f$>50% or when the twisting pitch P exceeds 36 (m/rev·m) while the volume filling ratio $V_f$ satisfies 50%≥$V_f$≥20%, the continuous fiber pellet is in a state where twisting is insufficient (a state where the reinforcing fiber bundle is dispersed exceedingly to the peripheral portion of the pellet cross section). The peripheral surface resin layer on the continuous fiber pellet thus becomes too thin, which readily gives rise to breaking of the continuous fiber strand resulting from the occurrence of breakage or fluffing of the mono-filament fibers during the manufacture of the continuous fiber strand.

As has been described, the continuous fiber pellets on which are formed the peripheral surface resin layers having an adequate thickness can be obtained by using a bundle of mono-filament fibers (rovings) having a diameter of 4 to 30 μm as the reinforcing fiber bundle, setting the number of the mono-filament fibers so that the reinforcing fiber bundle is impregnated with molten thermoplastic resin for the volume filling ratio $V_f$ of the reinforcing fiber bundle to fall within a range of 70% to 20%, while setting the twisting angle θ so that the resin-impregnated reinforcing fiber bundle is pultruded with twisting for the twisting pitch P to fall within the range of 2.5 to 36 (r/rev·m), and more preferably, to be in a range given as 2.5 (m/rev·m)≤P<6.0 (m/rev·m) when 70%≥$V_f$>50%, and to be in a range given as 6.0 (m/rev·m) ≤P≤36 (m/rev·m) when 50%≥$V_f$≥20%, followed by the cutting of the resulting continuous fiber strand by a specific length.

Table 1 below shows examples of concrete numerical values of the twisting angle θ, the twisting pitch P, the diameter d of the continuous fiber strand, and the twisting number X.

TABLE 1

| θ | tan θ | P | TWIST NUMBER X (rev/m) FOR EACH STRAND DIAMETER d (mm) | | | | | | |
|---|---|---|---|---|---|---|---|---|---|
| | | | d = 1.0 | d = 1.5 | d = 2.0 | d = 2.5 | d = 3.0 | d = 3.5 | d = 4.0 |
| 5 | 0.087 | 35.9 | 28 | 19 | 14 | 11 | 9 | 8 | 7 |
| 10 | 0.176 | 17.8 | 56 | 37 | 28 | 22 | 19 | 16 | 14 |
| 15 | 0.268 | 11.7 | 85 | 57 | 43 | 34 | 28 | 24 | 21 |
| 20 | 0.364 | 8.63 | 116 | 77 | 58 | 46 | 39 | 33 | 29 |
| 25 | 0.466 | 6.74 | 148 | 99 | 74 | 59 | 49 | 42 | 37 |
| 30 | 0.577 | 5.44 | 184 | 123 | 92 | 74 | 61 | 53 | 46 |
| 35 | 0.700 | 4.49 | 223 | 149 | 111 | 89 | 74 | 64 | 56 |
| 40 | 0.839 | 3.74 | 267 | 178 | 134 | 107 | 89 | 76 | 67 |
| 45 | 1 | 3.14 | 318 | 212 | 159 | 127 | 106 | 91 | 80 |
| 50 | 1.192 | 2.64 | 379 | 253 | 190 | 152 | 126 | 108 | 95 |

θ: TWISTING ANGLE(°) P: TWISTING PITCH(m/rev · m)

Further, the inventors discovered a ratio $A_f$, which is the index indicating a dispersion state of the reinforcing fiber bundle in the continuous fiber pellet cross section (continuous fiber strand cross section), and achieved a configuration by which the ratio $A_f$ indicating the dispersion state of the reinforcing fiber bundle falls within a specific range in response to the volume filling ratio $V_f$ of the reinforcing fiber bundle. According to this configuration, it is possible to obtain the continuous fiber pellets on which are formed the peripheral surface resin layers having an adequate thickness in a more reliable manner even in the presence of a difference in characteristics of the reinforcing fiber bundle and a variance in characteristics of the manufacturing apparatus.

Figure 6:
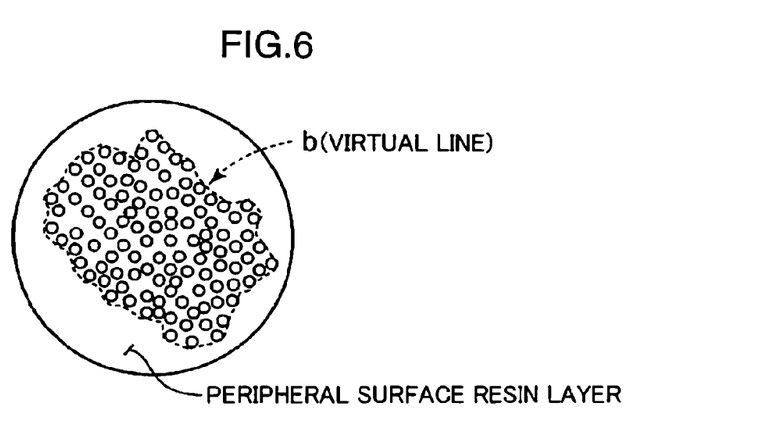
FIG. 6 is a view used to describe a ratio $A_f$ indicating a dispersion state of the reinforcing fiber bundle.
Figure 7:
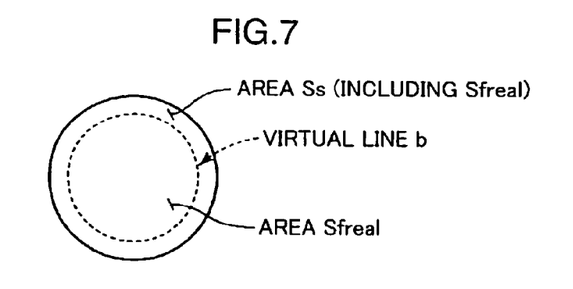
FIG. 7 is a view used to describe the ratio $A_f$.

In other words, as are shown in FIG. 6 and FIG. 7, the ratio $A_f$ (%) indicating the dispersion state of the reinforcing fiber bundle is a proportion (%) in the continuous fiber pellet cross section (continuous fiber strand cross section) of the area $S_{freal}$ (m²) inside a virtual line b enclosing the outermost peripheral portion of the reinforcing fiber bundle within the continuous fiber pellet cross section in the area $S_s$ (m²) of the continuous fiber pellet cross section.

$$A_f = (S_{freal}/S_s) \times 100 \quad (11)$$

The ratio $A_f$ depends on the number of mono-filament fibers used for the value of a given continuous fiber pellet cross section (continuous fiber strand cross section), that is, the volume filling ratio $V_f$, and varies with the twisting pitch P. In other words, the ratio $A_f$ tends to increase as the volume filling ratio $V_f$ becomes higher, and the ratio $A_f$ increases as the twisting pitch P becomes larger (the twisting number is reduced) because a twisting force to concentrate the reinforcing fiber bundle becomes smaller.

When the volume filling ratio $V_f$ satisfies 70%≥$V_f$>50%, the ratio $A_f$ is preferably in a range given as $(1.8V_f - 0.01V_f^2)$%≤ $A_f$≤95%, and when volume filling ratio $V_f$ satisfies 50%≥$V_f$≥20%, the ratio $A_f$ is preferably in a range given as $(2.3V_f - 0.02V_f^2)$%≤$A_f$≤95%.

To be more specific, if the ratio $A_f$ drops below the lower limit value, $(1.8V_f - 0.01V_f^2)$%, when the volume filling ratio $V_f$ satisfies 70%≥$V_f$>50%, or if the ratio $A_f$ drops below the lower limit value, $(2.3V_f - 0.02V_f^2)$%, when the volume filling ratio $V_f$ satisfies 50%≥$V_f$≥20%, the strand is in a state where the reinforcing fiber bundle concentrates exceedingly in the center portion of the pellet cross section, which makes the peripheral surface resin layer on the continuous fiber pellet too thick. This deteriorates the dispersion property of the reinforcing fiber bundle in injection molded articles, and neither can a satisfactory outward appearance of the injection molded articles be achieved, nor can the mechanical strength of the injection molded articles be satisfied by fully exerting the reinforcing effect.

On the other hand, if the ratio $A_f$ exceeds the upper limit value, 95, when the volume filling ratio $V_f$ satisfies 70%≥$V_f$>50%, or if the ratio $A_f$ exceeds the upper limit, 95, when the volume filling ratio $V_f$ satisfies 50%≥$V_f$≥20%, the strand is in a state where the reinforcing fiber bundle disperses exceedingly to the peripheral portion of the pellet cross section, which makes the peripheral surface resin layer on the continuous fiber pellet too thin and in sufficient. This readily gives rise to breaking of the continuous fiber strand resulting from the occurrence of breakage or fluffing of the mono-filament fibers during the manufacture of the continuous fiber strand.

Regarding the ratio $A_f$, the lower limit value, $(1.8V_f - 0.01V_f^2)$%, when 70%≥$V_f$>50% and the lower limit value, $(2.3V_f - 0.02V_f^2)$%, when 50%≥$V_f$≥20% are derived by the following procedure.

Figure 8:
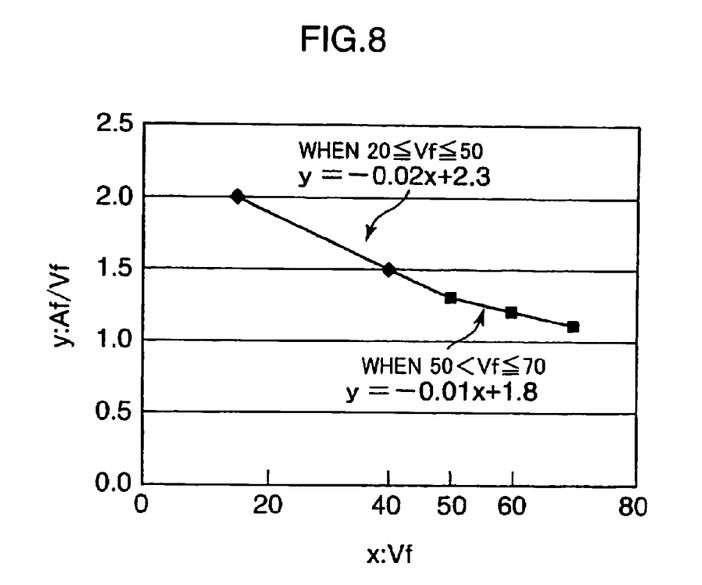
FIG. 8 is a view used to describe the procedure to derive a lower limit value of the ratio $A_f$.

That is to say, (i) for individual continuous fiber pellets obtained by changing the twisting pitch P in various manners when the volume filling ratio $V_f$ is in a range of 70% to 20%, the cross section $S_s$ of the continuous fiber pellet and the area $S_{freal}$ inside the virtual line b in the pellet cross section are actually measured by an image processing apparatus on the basis of the SEM observation of the pellet cross sections to find the ratio $A_f$ in accordance with Equation (11) above. (ii) The value of $(A_f/V_f)$ is calculated for the individual continuous fiber pellets. The value of $(A_f/V_f)$ indicates the dispersion state of the reinforcing fiber bundle with respect to the set volume filling ratio $V_f$. (iii) The lower limit values of $(A_f/V_f)$ at which satisfactory injection molded articles can be obtained when $50\% \geq V_f \geq 20\%$ are found, and an empirical equation (regression formula) is generated using these values (see FIG. 8). The lower limit value of the ratio $A_f=(2.3V_f-0.02V_f^2)\%$ is found from the relation, $(A_f/V_f)=-0.02V_f+2.3$. (iv) The lower limit values of $(A_f/V_f)$ at which satisfactory injection molded articles can be obtained when $70\% \geq V_f > 50\%$ are found, and an empirical equation (regression formula) is generated using these values (see FIG. 8). The lower limit value of the ratio $A_f=(1.8V_f-0.01V_f^2)\%$ is found from the relation, $(A_f/V_f)=-0.01V_f+1.8$.

As has been described, the continuous fiber pellets on which are formed the peripheral surface resin layers having an adequate thickness can be obtained by using a bundle of mono-filament fibers (rovings) having a diameter of 4 to 30 pArt as the reinforcing fiber bundle, and setting the number of the mono-filament fibers so that the reinforcing fiber bundle is impregnated with molten thermoplastic resin for the volume filling ratio $V_f$ of the reinforcing fiber bundle to fall within the range of 70% to 20%, while pultruding the resin-impregnated reinforcing fiber bundle with twisting by setting the twisting angle so that the ratio $A_f$ indicating the dispersion state of the reinforcing fiber bundle falls within a range given as $(1.8V_f-0.01V_f^2)\% \leq A_f \leq 95\%$ when $70\% \geq V_f > 50\%$ and a range given as $(2.3V_f-0.02V_f^2)\% \leq A_f \leq 95\%$ when $50\% \geq V_f \geq 20\%$, followed by the cutting of the resulting continuous fiber strand by a specific length.

(Examples)

A continuous fiber strand was manufactured with the manufacturing apparatus shown in FIG. 1 using polypropylene (specific gravity: 0.9 g/cm³) as the thermoplastic resin and mono-filament fibers of glass fiber (specific gravity: 2.5 g/cm³, fiber diameter df: 17 μm). Continuous fiber pellets having the dimension, diameter 3.0 mm×length 6 mm, were manufactured by cutting the resulting continuous fiber strand.

The cross section of the continuous fiber pellets thus obtained was observed using an SEM (Scanning Electron Microscope) to observe a distribution state (the degree of thickness of the peripheral surface resin layer) of the glass fiber bundle in the pellet cross section and to measure the above-specified ratio $A_f$(%) indicating the dispersion state of the reinforcing fiber bundle. In Table 2 below, regarding the evaluation of the distribution state of the glass fiber bundle (reinforcing fiber bundle) in the pellet cross section, those having an adequate thickness of the peripheral surface resin layer (the ratio $A_f$ satisfies the range specified in the invention) are marked with O, and those having a thickness of the peripheral surface resin layer that falls outside the adequate range are marked with X.

The continuous fiber pellets thus obtained were used as a molding raw material, and strip specimens (length 200 mm×width 15 mm×thickness 2 mm) were injection molded using an injection molding machine (full flight screw having 40 mmφ) having a mold clamping force of 100 tons. In examples and comparative examples below, each pellet used was diluted with resin pellet as needed so that a rate of content of fibers in the injection molded articles (strip specimens) was 20%.

The surface state of the injection molded articles (strip specimens) was observed visually to check whether non-dispersed glass fiber bundle was present on the surfaces of the molded articles. In Table 2 below, regarding the evaluation of the surface state of injection molded articles, those in which a non-dispersed glass fiber bundle was absent are marked with O and those in which a non-diffused glass fiber bundle was present are marked with X.

In Example 1, continuous fiber pellets having the pellet diameter of 3.0 mm, the volume filling ratio $V_f$ of 42.2%, and the twisting pitch P of 5.44 m/rev·m were manufactured according to the manufacturing method set forth in claim 5. The ratio $A_f$ of the obtained continuous fiber pellets was 64%. In Example 2, continuous fiber pellets having the pellet diameter of 3.0 mm, the volume filling ratio $V_f$ of 42.2%, and the twisting pitch P of 8.62 m/rev·m were manufactured according to the manufacturing method set forth in claim 6. The ratio $A_f$ of the obtained continuous fiber pellets was 75%. In Example 3, continuous fiber pellets having the pellet diameter of 3.0 mm, the volume filling ratio $V_f$ of 42.2%, and the twisting pitch P of 17.82 m/rev·m were manufactured according to the manufacturing method set forth in claim 6. The ratio $A_f$ of the obtained continuous fiber pellets was 89%.

In Example 4, continuous fiber pellets having the pellet diameter of 3.0 mm, the volume filling ratio $V_f$ of 59.0%, and the twisting pitch P of 3.72 m/rev·m were manufactured according to the manufacturing method set forth in claim 6. The ratio $A_f$ of the obtained continuous fiber pellets was 74%. In Example 5, continuous fiber pellets having the pellet diameter of 3.0 mm, the volume filling ratio $V_f$ of 29.7%, and the twisting pitch P of 17.82 m/rev·m were manufactured according to the manufacturing method set forth in claim 6. The ratio $A_f$ of the obtained continuous fiber pellets was 81%.

The observation results of the distribution state of the glass fiber bundle in the pellet cross sections (the degree of thickness of the peripheral surface resin layer) and the observation results of the surface state of the injection molded articles (strip specimens) of Examples 1 through 5 are set forth in Table 2 below.

TABLE 2

| CLASSIFICATION | PELLET DIAMETER (STRAND DIAMETER) d(mm) | VOLUME FILLING RATIO $V_f$(%) | TWISTING PITCH P(m/rev·m) | TWISTING ANGLE θ(°) | RATIO $A_f$ (%) | FIBER DISTRIBUTION STATE IN PELLET CROSS SECTION | SURFACE STATE OF INJECTION MOLDED ARTICLE |
|---|---|---|---|---|---|---|---|
| EXAMPLE 1 | 3.0 | 42.2 | 5.44 | 30 | 64 | o | o |
| EXAMPLE 2 | 3.0 | 42.2 | 8.63 | 20 | 75 | o | o |
| EXAMPLE 3 | 3.0 | 42.2 | 17.82 | 10 | 89 | o | o |
| EXAMPLE 4 | 3.0 | 59.0 | 3.74 | 40 | 74 | o | o |
| EXAMPLE 5 | 3.0 | 29.7 | 17.82 | 10 | 81 | o | o |
| COMPARATIVE EXAMPLE 1 | 3.0 | 59.0 | 2.20 | 55 | 70 | x | x |
| COMPARATIVE EXAMPLE 2 | 3.0 | 59.0 | 35.91 | 5 | 99 | x | x |
| COMPARATIVE EXAMPLE 3 | 3.0 | 15.0 | 35.91 | 5 | — | x | x |

TABLE 2-continued

| CLASSIFICATION | PELLET DIAMETER (STRAND DIAMETER) d(mm) | VOLUME FILLING RATIO $V_f$(%) | TWISTING PITCH P(m/rev·m) | TWISTING ANGLE $\theta$(°) | RATIO $A_f$ (%) | FIBER DISTRIBUTION STATE IN PELLET CROSS SECTION | SURFACE STATE OF INJECTION MOLDED ARTICLE |
|---|---|---|---|---|---|---|---|
| COMPARATIVE EXAMPLE 4 | 3.0 | 75.0 | 5.44 | 30 | — | — | — |

As can be understood from Table 2, satisfactory results were obtained from each of Examples 1 through 5.

Meanwhile, Comparative Example 1 was the same as Example 4 except that the twisting pitch P deviated from the lower limit value (2.5 m/rev·m) specified in the invention. Hence, the continuous fiber pellets in Comparative Example 1 were in a state where too many twists were imparted (in a state where the reinforcing fiber bundle exceedingly concentrated in the center portion of the pellet cross section), and the peripheral surface resin layers thereof were too thick. It therefore became difficult for the plasticization to take place during injection molding and a non-dispersed glass fiber bundle was left on the surface of the molded articles. The ratio $A_f$ of the continuous fiber pellets of Comparative Example 1 was 70%, which is lower than 71.4% specified as the lower limit value of the ratio $A_f$ in the invention.

Comparative Example 2 was the same as Example 4 except that the twisting pitch P deviated from the upper limit value (lower than 6.0 m/rev·m) specified in the invention. Hence, the continuous fiber pellets of Comparative Example 2 were in a state where they were twisted insufficiently (a state where the reinforcing fiber bundle was dispersed exceedingly to the peripheral portion of the pellet cross section), and the peripheral surface resin layers were too thin. Hence, breaking of the continuous fiber strand resulting from the occurrence of breakage or fluffing of the mono-filament fibers occurred during the manufacture of the continuous fiber strand. The ratio $A_f$ of the continuous fiber pellets of Comparative Example 2 was 99%, which exceeds 95% specified as the upper limit value of the ratio $A_f$ in the invention.

In Comparative Example 3, the volume filling ratio $V_f$ deviated from the lower limit value (20%) specified in the invention. Hence, the continuous fiber pellets of Comparative Example 3 exerted the reinforcing effect by the reinforcing fibers only insufficiently and the mechanical strength of the injection molded articles was not satisfied. In Comparative Example 3, breaking of the continuous fiber strand resulting from the occurrence of breakage or fluffing of the mono-filament fibers did not occur during the manufacture of the continuous fiber strand.

In Comparative Example 4, the volume filling ratio $V_f$ deviated from the upper limit value (70%) specified in the invention. Hence, in Comparative Example 4, because the reinforcing fiber bundle accounted for too large a proportion, it became difficult for the reinforcing fiber bundle to be impregnated with molten thermoplastic resin, and the pultruding resistance was increased and breaking of the reinforcing fiber bundle occurred, which made the pultruding operation of the continuous fiber strand no longer possible during the manufacture of the continuous fiber pellets.

INDUSTRIAL APPLICABILITY

Continuous fiber-reinforced thermoplastic resin pellets of the invention are continuous fiber-reinforced thermoplastic resin pellets manufactured by cutting a rod-shaped composition formed of a twisted resin-impregnated reinforcing fiber bundle into pellets of a specific length, and those in which the reinforcing fiber bundle twisted and continuing in the pellet longitudinal direction (pellet length direction) is present in the thermoplastic resin, peripheral surface resin layers on the pellets have an adequate thickness. Hence, they have a good dispersion property of the reinforcing fiber bundle in injection molded articles and are able to achieve a satisfactory appearance of the injection molded articles and satisfy the mechanical strength of the injection molded articles by fully exerting the reinforcing effect.

Also, according to a manufacturing method of continuous fiber-reinforced thermoplastic resin pellets of the invention, when continuous fiber-reinforced thermoplastic resin pellets are manufactured by letting a long reinforcing fiber bundle be impregnated with molten thermoplastic resin, and pultruding the resin-impregnated reinforcing fiber bundle with twisting, followed by the cutting of a rod-shaped composition formed of the twisted resin-impregnated reinforcing fiber bundle by a specific length, it is possible to obtain continuous fiber-reinforced thermoplastic resin pellets, in which a reinforcing fiber bundle twisted and continuing in the pellet longitudinal direction is present in the thermoplastic resin and on which surface resin layers having an adequate thickness are formed.

The invention claimed is:

1. A manufacturing method of a continuous fiber-reinforced thermoplastic resin pellet having a rod-shaped configuration with a circular cross section, consisting of:
   preheating a long reinforcing fiber bundle,
   impregnating the preheated long reinforcing fiber bundle with molten thermoplastic resin and pultruding and twisting the resin-impregnated reinforcing fiber bundle with a single pair of oppositely disposed metal twisting rollers with rotating shaft lines which are crossed in the vertical plane and parallel in the horizontal plane, which single pair of rollers both pultrudes and twists the continuous fiber-reinforced resin strand running in between, followed by cutting of a rod-shaped composition formed of the twisted resin-impregnated reinforcing fiber bundle by a specific length, wherein:
   a bundle of mono-filament fibers having a diameter of 4 to 30 μm is present as the reinforcing fiber bundle;
   the number of the mono-filament fibers is set so that the reinforcing fiber bundle is impregnated with the molten thermoplastic resin for a volume filling ratio $V_f$, which is a proportion of a cross section area of the reinforcing fiber bundle in a cross section area of a rod-shaped composition cross section in a direction perpendicular to a rod-shaped composition longitudinal direction, to fall within a range of 70% to 20%; and
   the resin-impregnated reinforcing fiber bundle is pultruded with twisting by setting a twisting angle of the twisting rollers so that a twisting pitch P given by P=L/d (where L is a traveling length of a twist in the rod-shaped composition longitudinal direction per rotation of the rod-shaped composition, and d is a diameter of a circle comparable to an area of the rod-shaped composition cross section) falls within a range of 2.5 to 36 (m/rev·m), so that a thickness of a peripheral surface resin layer is adjusted corresponding to the number of the mono-filament fibers and the diameter of a circle comparable to an area of the rod-shaped composition cross section;

wherein the twisting angle is set so that when the volume filling ratio $V_f$ satisfies 70%≥$V_f$>50%, the twisting pitch P is in a range given as 2.5 (m/rev·m)≤P<6.0 (m/rev·m), and when the volume filling ratio $V_f$ satisfies 50%≥$V_f$≥20%, the twisting pitch P is in a range given as 6.0 (m/rev·m)≤P≤36 (m/rev·m); and wherein the diameter d of a circle comparable to an area of the rod-shaped configuration with a circular cross section ranges from 1.0 to 4.0 mm and the length of each fiber-reinforced thermoplastic resin pellet ranges from about 3 to 10 mm.

2. The manufacturing method of continuous fiber-reinforced thermoplastic resin pellets according to claim 1, wherein:

the twisting angle is set so that when the volume filling ratio $V_f$ satisfies 70%≥$V_f$>50%, a ratio $A_f$ in the rod-shaped composition cross section, which is a proportion of an area inside a virtual line enclosing an outermost peripheral portion of the reinforcing fiber bundle within the rod-shaped composition cross section in an area of the rod-shaped composition cross section, is in a range given as $(1.8V_f - 0.01V_f^2)$%≤$A_f$≤95%, and when the volume filling ratio $V_f$ satisfies 50%≥$V_f$≥20%, the ratio $A_f$ is in a range given as $(2.3V_f - 0.02V_f^2)$%≤$A_f$≤95%.

3. A manufacturing method of a continuous fiber-reinforced thermoplastic resin pellet having a rod-shaped configuration with a circular cross section, consisting of:

preheating a long reinforcing fiber bundle, impregnating the preheated long reinforcing fiber bundle with molten thermoplastic resin and pultruding and twisting the resin-impregnated reinforcing fiber bundle with a single pair of oppositely disposed metal twisting rollers with rotating shaft lines which are crossed in the vertical plane and parallel in the horizontal plane, which single pair of rollers both pultrudes and twists the continuous fiber-reinforced resin strand running in between, followed by cutting of a rod-shaped composition formed of the twisted resin-impregnated reinforcing fiber bundle by a specific length, wherein:

a bundle of mono-filament fibers having a diameter of 4 to 30 μm is present as the reinforcing fiber bundle;

the number of the mono-filament fibers is set so that the reinforcing fiber bundle is impregnated with the molten thermoplastic resin for a volume filling ratio $V_f$, which is a proportion of a cross section area of the reinforcing fiber bundle in a cross section area of a rod-shaped composition cross section in a direction perpendicular to a rod-shaped composition longitudinal direction, to fall within a range of 70% to 20%; and the resin-impregnated reinforcing fiber bundle is pultruded with twisting by setting a twisting angle of the twisting rollers so that when the volume filling ratio $V_f$ satisfies 70%≥$V_f$>50%, a ratio $A_f$ in the rod-shaped composition cross section, which is a proportion of an area inside a virtual line enclosing an outermost peripheral portion of the reinforcing fiber bundle within the rod-shaped composition cross section in an area of the rod-shaped composition cross section, is in a range given as $(1.8V_f - 0.01V_f^2)$%≤$A_f$≤95%, and when the volume filling ratio $V_f$ satisfies 50%≥$V_f$≥20%, the ratio $A_f$ is in a range given as $(2.3V_f - 0.02V_f^2)$%≤$A_f$≤95%, so that a thickness of a peripheral surface resin layer is adjusted by adjusting a dispersion state of the reinforcing fiber bundle in pellet cross section);

wherein the diameter d of a circle comparable to an area of the rod-shaped composition cross section ranges from 1.0 to 4.0 mm and the length of each fiber-reinforced thermoplastic resin pellet ranges from about 3 to 10 mm.

4. The manufacturing method of continuous fiber-reinforced thermoplastic resin pellets according to claim 1, wherein the rotating shaft line of an upper twisting roller and the rotating shaft line of a lower twisting roller are set not in directions orthogonal to the pultruding direction (running direction) of the continuous fiber-reinforced resin strand but in directions opposite to each other and in orientations shifted equally by a specific angle with respect to the pultruding direction when viewed in a plane.

5. The manufacturing method of continuous fiber-reinforced thermoplastic resin pellets according to claim 3, wherein the rotating shaft line of the upper twisting roller and the rotating shaft line of the lower twisting roller are set not in directions orthogonal to the pultruding direction (running direction) of the continuous fiber-reinforced resin strand but in directions opposite to each other and in orientations shifted equally by a specific angle with respect to the pultruding direction when viewed in a plane.

6. The manufacturing method of continuous fiber-reinforced thermoplastic resin pellets according to claim 1, wherein asperities are formed on the roller surfaces.

7. The manufacturing method of continuous fiber-reinforced thermoplastic resin pellets according to claim 3, wherein asperities are formed on the roller surfaces.

8. The manufacturing method of continuous fiber-reinforced thermoplastic resin pellets according to claim 1, wherein the long reinforcing fiber bundle is preheated by contact heating.

9. The manufacturing method of continuous fiber-reinforced thermoplastic resin pellets according to claim 3, wherein the long reinforcing fiber bundle is preheated by contact heating.

10. The manufacturing method of continuous fiber-reinforced thermoplastic resin pellets according to claim 1, wherein the long reinforcing fiber bundle is preheated by contact with heating rollers.

11. The manufacturing method of continuous fiber-reinforced thermoplastic resin pellets according to claim 3, wherein the long reinforcing fiber bundle is preheated by contact with heating rollers.

* * * * *